United States Patent
Aoki et al.

(10) Patent No.: US 9,258,461 B2
(45) Date of Patent: Feb. 9, 2016

(54) IMAGE PROCESSING DEVICE AND METHOD, AND IMAGE PROCESSING PROGRAM

(71) Applicants: Toru Aoki, Tokyo (JP); Mitsuo Hashimoto, Tokyo (JP); Narihiro Matoba, Tokyo (JP)

(72) Inventors: Toru Aoki, Tokyo (JP); Mitsuo Hashimoto, Tokyo (JP); Narihiro Matoba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/390,626

(22) PCT Filed: Feb. 21, 2013

(86) PCT No.: PCT/JP2013/054318
§ 371 (c)(1),
(2) Date: Oct. 3, 2014

(87) PCT Pub. No.: WO2013/150824
PCT Pub. Date: Oct. 10, 2013

(65) Prior Publication Data
US 2015/0054990 A1    Feb. 26, 2015

(30) Foreign Application Priority Data
Apr. 4, 2012    (JP) .................................. 2012-085416

(51) Int. Cl.
*H04N 5/00*    (2011.01)
*H04N 5/217*    (2011.01)
(Continued)

(52) U.S. Cl.
CPC .............. *H04N 5/2173* (2013.01); *G06T 5/002* (2013.01); *G06T 5/20* (2013.01); *H04N 5/23229* (2013.01);
(Continued)

(58) Field of Classification Search
CPC ........... H04N 5/00; H04N 5/21; H04N 5/213; H04N 5/2173; H04N 5/23229; H04N 5/357; G06T 5/002; G06T 5/20; G06T 2207/10016; G06T 2207/20024; G06T 2207/20182
USPC ....................................................... 348/607
See application file for complete search history.

(56) References Cited

U.S. PATENT DOCUMENTS 5,490,094 A * 2/1996 Heimburger .............. G06T 5/20
                                                     333/166
2004/0027469 A1    2/2004 Tsuruoka
(Continued)

FOREIGN PATENT DOCUMENTS

JP    7-134772 A    5/1995
JP    2002-185795 A    6/2002
(Continued)

OTHER PUBLICATIONS

T. Shimada et al., "A Study on Noice Reduction using Multi Frame", Proceedings of the 2009 IEICE General Conference, Joho System 2, p. 52, Mar. 4, 2009.
(Continued)

*Primary Examiner* — Michael Lee
(74) *Attorney, Agent, or Firm* — Birch, Stewart, Kolasch & Birch, LLP

(57) ABSTRACT

An NR coefficient (Kf) is calculated on the basis of a representative value (Pm) of a pixel of interest and a low-pass filtered value (La-Ld) nearest to the representative value (Pm) of the pixel of interest among a plurality of low-pass filtered values filtered one-dimensionally in different directions in an input image, and the pixel value of the pixel of interest and a value output by a two-dimensional low-pass filter (25) are weighted by the NR coefficient (Kf) and added (36). The representative value of the pixel of interest may be, for example, a median value obtained by filtering the current frame and a past frame in the time axis direction. The image processing device reduces noise without lowering resolution.

20 Claims, 11 Drawing Sheets

(51) Int. Cl.
*H04N 5/232* (2006.01)
*H04N 5/357* (2011.01)
*G06T 5/00* (2006.01)
*G06T 5/20* (2006.01)

(52) U.S. Cl.
CPC ...... *H04N 5/357* (2013.01); *G06T 2207/10016* (2013.01); *G06T 2207/20024* (2013.01); *G06T 2207/20182* (2013.01)

(56) References Cited

U.S. PATENT DOCUMENTS

| | | | |
|---|---|---|---|
| 2005/0135700 A1* | 6/2005 | Anderson | G06T 5/002 382/261 |
| 2006/0245506 A1 | 11/2006 | Lin et al. | |
| 2007/0285441 A1 | 12/2007 | Fukuoka | |
| 2009/0208129 A1 | 8/2009 | Shimodaira | |
| 2010/0060749 A1 | 3/2010 | Srinivasan et al. | |
| 2010/0066868 A1 | 3/2010 | Shohara | |
| 2011/0205404 A1 | 8/2011 | Tamura et al. | |
| 2012/0314137 A1* | 12/2012 | Numao | H04N 5/213 348/607 |

FOREIGN PATENT DOCUMENTS

| | | |
|---|---|---|
| JP | 2003-132352 A | 5/2003 |
| JP | 2004-72422 A | 3/2004 |
| JP | 2007-312304 A | 11/2007 |
| JP | 2009-199104 A | 9/2009 |
| JP | 2010-39832 A | 2/2010 |
| JP | 2010-92461 A | 4/2010 |
| JP | 2011-124694 A | 6/2011 |
| WO | 2006/010276 A1 | 2/2006 |

OTHER PUBLICATIONS

Amer et al., "Fast and Reliable Structure-Oriented Video Noise Estimation", IEEE Transactions on Circuits and Systems for Video Technology, vol. 15, No. 1, Jan. 10, 2005, pp (113-118).

Extended European Search Report dated Dec. 3, 2015, issued in European Patent Application No. 13772701.2.

* cited by examiner

FIG.4

| P | | P | | P | | P | | P | | P | | P | | P | | P |
|---|---|---|---|---|---|---|---|---|---|---|---|---|---|---|---|---|
| | | | | | | | | | | | | | | | | |
| P | | P | | P | | P | | P | | P | | P | | P | | P |
| | | | | | | | | | | | | | | | | |
| P | | P | | P | | P | | P | | P | | P | | P | | P |
| | | | | | | | | | | | | | | | | |
| P | | P | | P | | P | | P | | P | | P | | P | | P |
| | | | | | | | | | | | | | | | | |
| P | | P | | P | | P | | P(x,y) | | P | | P | | P | | P |
| | | | | | | | | | | | | | | | | |
| P | | P | | P | | P | | P | | P | | P | | P | | P |
| | | | | | | | | | | | | | | | | |
| P | | P | | P | | P | | P | | P | | P | | P | | P |
| | | | | | | | | | | | | | | | | |
| P | | P | | P | | P | | P | | P | | P | | P | | P |
| | | | | | | | | | | | | | | | | |
| P | | P | | P | | P | | P | | P | | P | | P | | P |

IMAGE PROCESSING DEVICE AND METHOD, AND IMAGE PROCESSING PROGRAM

TECHNICAL FIELD

The present invention relates to an image processing device and method for reducing noise contaminating the input image in a digital camera or the like, and to an image processing program.

BACKGROUND ART

Noise contaminates image data in the image input systems or image transmission systems of image input devices such as digital cameras or the like having CCD or other imaging elements, or image output devices such as displays that display images input from these types of image input devices. This type of noise is generally reduced by image processing in the device. Conventional methods of reducing noise contamination in such image input devices or image output devices will now be described.

The simplest and most general way to reduce noise is a technique known as low-pass filtering, in which a processing window consisting of a plurality of pixels centered on the pixel to be processed (referred to below as the pixel of interest) is defined, and a weighted sum of the pixel values of the pixel of interest and neighboring pixels in the processing window is taken. When this method is used, however, there is the problem that the low-pass filtering process also affects meaningful edges in the image that are not noise, lowering the resolution of the image.

Another proposed technique is to apply a Prewitt filter or a Sobel filter to the processing window to detect edges, and reduce the strength of the low-pass filter when the pixel of interest is found to be part of a meaningful edge in the image, or to apply the filter in the direction of an edge present nearby, thereby reducing noise with less loss of resolution (see, for example, Patent Reference 1).

PRIOR ART REFERENCES

Patent References

Patent Reference 1: Japanese Patent Application Publication No. 2002-185795

SUMMARY OF THE INVENTION

Problems to be Solved by the Invention

With the method of Patent Reference 1, there are problems of lowered resolution and inadequate noise reduction because noise that continues in a particular direction may be mistaken for an edge, and patterns present in the subject may be mistaken for noise.

This invention addresses the above problems with the object of enabling noise to be reduced without loss of resolution.

Means for Solving the Problems

An image processing device according to the invention is for receiving a moving picture including a time sequence of frames, the image processing device comprising:

a plurality of one-dimensional low-pass filters calculating respective low-pass filtered values using a pixel of interest and pixels aligned in different one-dimensional directions with respect to the pixel of interest, in a processing window including a plurality of pixels centered on the pixel of interest, in a frame of interest;

a peripheral low-pass filter outputting, as a peripheral low-pass filtered value, a low-pass filtered value obtained using the pixel of interest and neighboring pixels thereof in the processing window;

a representative value calculator for performing filtering in a time axis direction, based on a pixel value of the pixel of interest in the frame of interest and a pixel value of a pixel in a position corresponding to the pixel of interest in at least one frame other than the frame of interest, to obtain a representative value for the pixel of interest;

a noise level detector for calculating absolute values of differences between the representative value and each of the one-dimensionally low-pass filtered values and outputting, as a noise level of the pixel of interest, a minimum value among those of the calculated absolute differences that satisfy a predetermined condition;

an NR coefficient generator for receiving the noise level and generating a noise reduction coefficient corresponding to the noise level according to a predetermined input-output characteristic; and an NR processor for using the noise reduction coefficient to take a weighted sum of the pixel value of the pixel of interest and the peripheral low-pass filtered value; wherein the NR processor increases the weight of the peripheral low-pass filtered value as the noise reduction coefficient increases.

Effects of the Invention

Being configured in a way that enables the mixing ratio of the pixel value of the pixel of interest and the peripheral low-pass filtered value to be adjusted without distinguishing between pixel value variations due to true edges and noise, this invention makes it possible to reduce noise without loss of resolution, thereby obtaining an image of high quality.

BRIEF DESCRIPTION OF THE DRAWINGS

FIG. 4 is an explanatory diagram showing how filter processing is carried out by the third LPF in the first embodiment.

MODE FOR CARRYING OUT THE INVENTION

First Embodiment

Figure 1:
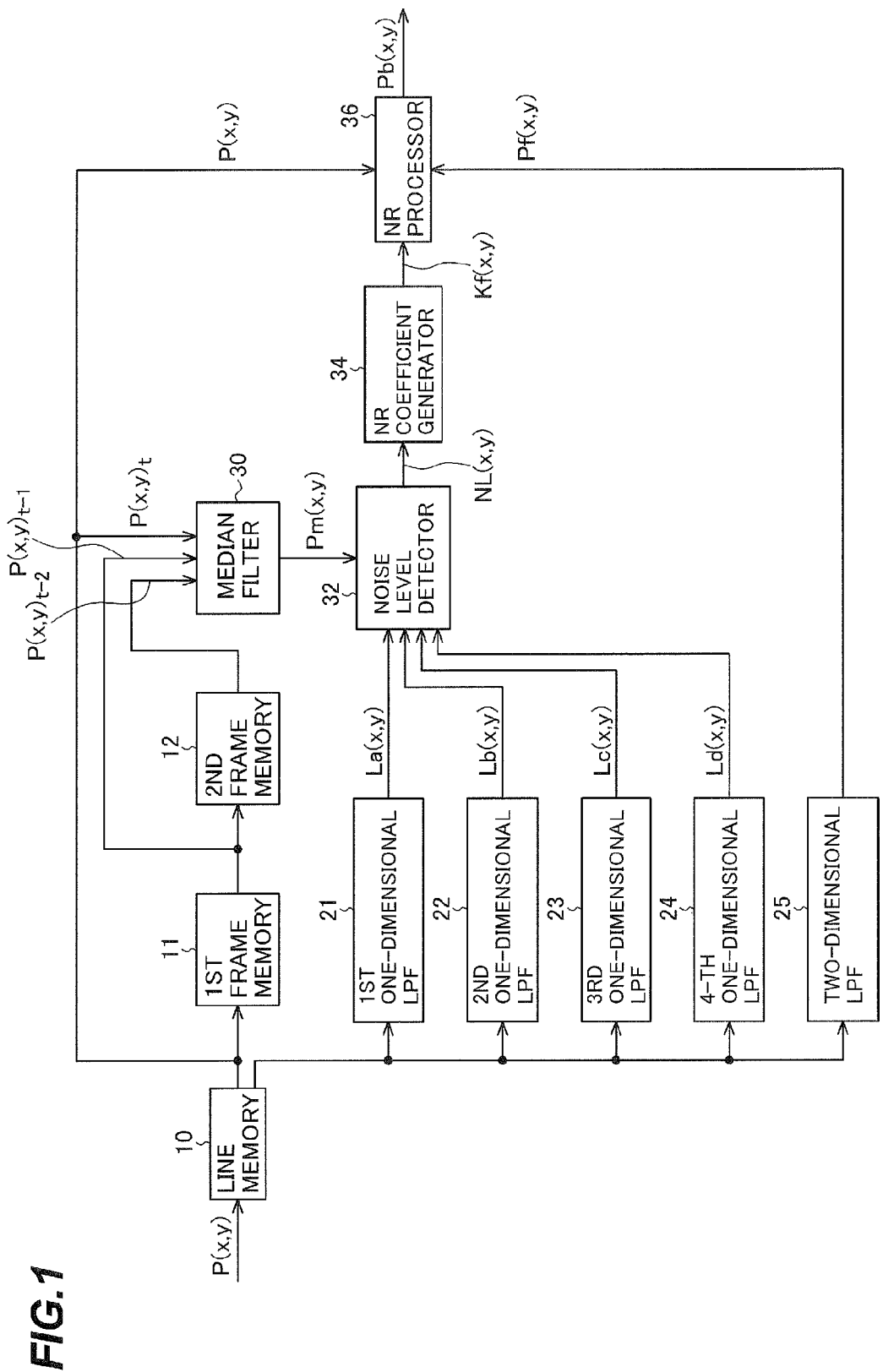
FIG. 1 is a block diagram showing an image processing device according to a first embodiment of the invention.

FIG. 1 shows the functional configuration of the image processing device according to the first embodiment of the invention.

The illustrated image processing device receives as its input image a moving picture consisting of a temporal series of frames supplied from, for example, an image input system such as an imaging element, or from an image transmission system (not shown). An image consists of pixels arranged in the horizontal direction (line direction) and the vertical direction (perpendicular direction), that is, in a matrix, and the input data consist of raster-ordered data representing the pixel values of the pixels constituting the image.

It will be assumed below that the input image is received from a single-element color digital camera using pixels with a Bayer array of color filters, and that the image signals of four captured colors (R, Gr, Gb, B) are input from the imaging element in the pixel array sequence.

The illustrated image processing device includes a line memory 10, first and second frame memories 11 and 12, first to fourth one-dimensional low-pass filters 21 to 24 (a low-pass filter will be referred to below as an LPF), a two-dimensional low-pass filter (LPF) 25, a median filter 30, a noise level detector 32, an NR coefficient generator 34, and an NR processor 36.

The line memory 10 receives input image data P(x, and holds the image data for a prescribed number of lines. The prescribed number of lines N is, for example, 17.

From among the N lines held in the line memory 10, the pixels in the central line are selected in turn as the pixel of interest, a rectangular region measuring N lines vertically and M pixels horizontally, centered on the selected pixel of interest, is defined as a processing window, and prescribed pixels in the processing window are output to the first to fourth one-dimensional LPFs 21 to 24 and the two-dimensional LPF 25.

In the example described below, M is equal to 17 as is N.

The input image data of the pixel of interest read from the line memory 10 are delayed with respect to the input image data input to the line memory 10 by a time delay of approximately N/2 lines, but the data content remains unchanged, so that both will be identically denoted P(x, y).

Each of the first and second frame memories 11 and 12 has a storage capacity of one frame of image data, and each is used as a delay unit for delaying, by one frame period, the output of the data of the pixel of interest among the data held in the line memory 10. As a result, the first frame memory 11 outputs image data one frame ahead of the current frame and the second frame memory 12 outputs image data two frames ahead of the current frame.

The one-dimensional LPFs 21 to 24 calculate LPF values La(x, y), Lb(x, y), Lc(x, y), and Ld(x, y) in mutually differing one-dimensional directions (0 degrees, 45 degrees, 90 degrees, 135 degrees) in the processing window measuring 17 pixels horizontally and 17 pixels vertically, centered on the pixel of interest in the input image data.

In other words, the plurality of LPFs 21 to 24 use the pixel of interest and pixels aligned in mutually differing one-dimensional directions in a processing window consisting of a plurality of pixels centered on the pixel of interest in the frame of interest, to calculate low-pass filtered values.

Figure 2:
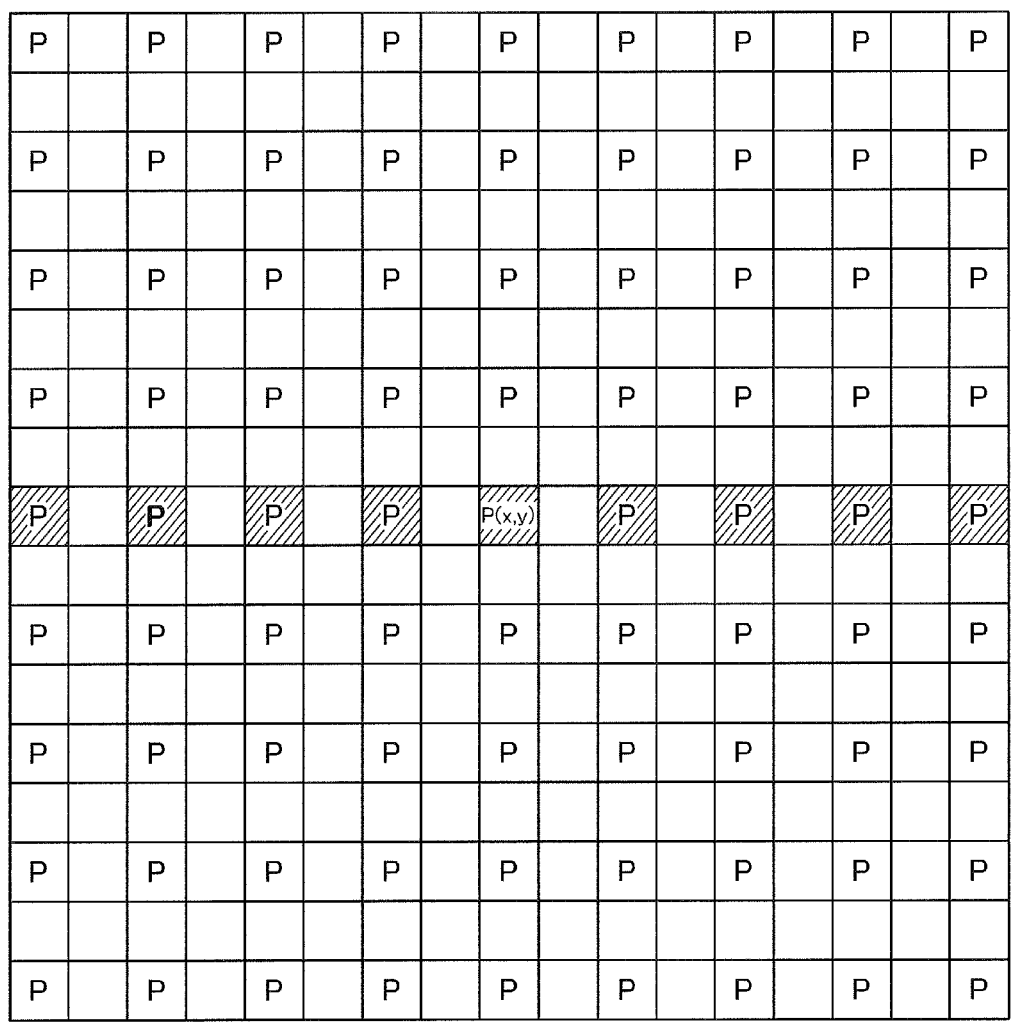
FIG. 2 is an explanatory diagram showing how filter processing is carried out by the first LPF in the first embodiment.

FIG. 2 shows the pixels used in the filter processing in the 0-degree direction in the processing window. The pixel at the central position is the pixel of interest P(x, y). The first LPF 21 performs filtering processing using the pixels (indicated by hatching), including the pixel of interest P(x, y), which are aligned in the 0-degree direction (horizontal direction).

The pixels constituting the input image have a Bayer array of color filters, but when filter processing is performed on the pixel of interest, only pixels of the same color among its neighboring pixels (pixels in the window), are used. This is also true of the second to fourth LPFs 22 to 24 and the two-dimensional LPF 25 described below.

Figure 3:
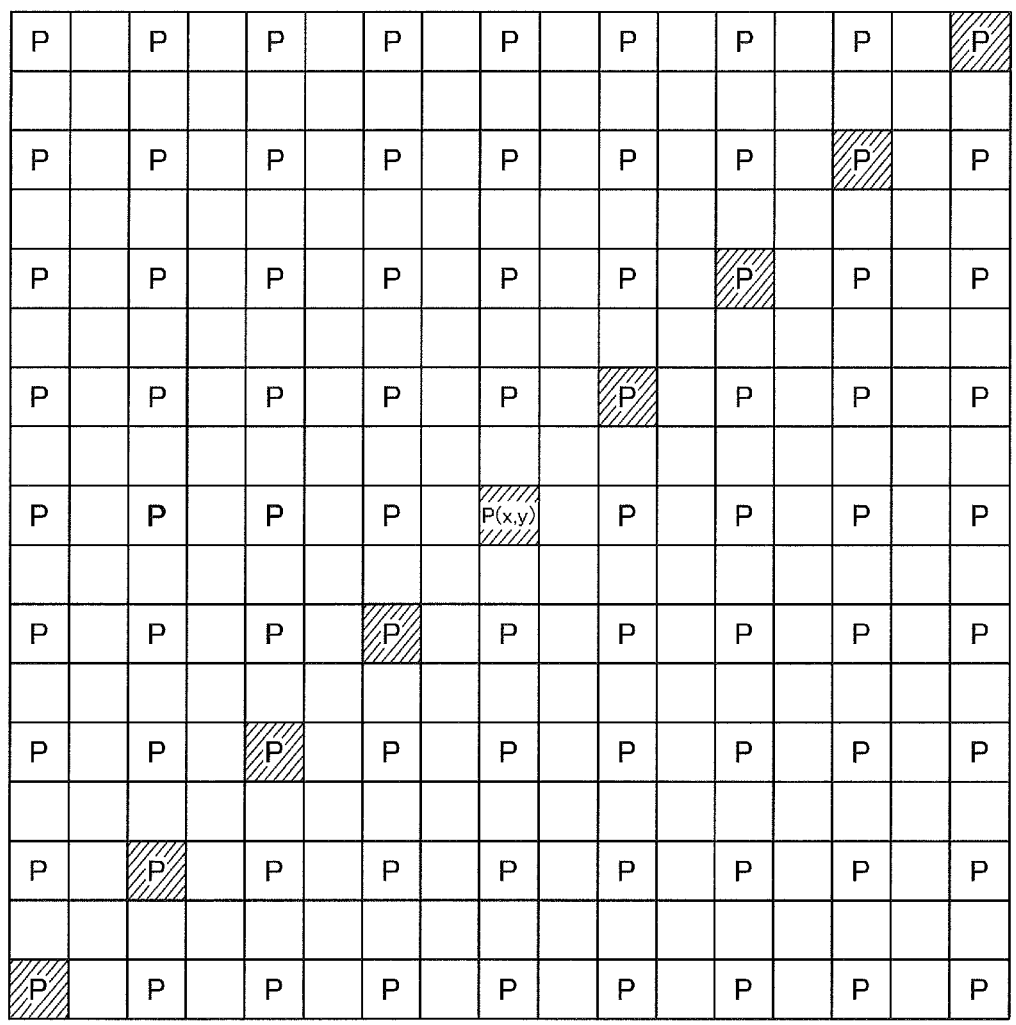
FIG. 3 is an explanatory diagram showing how filter processing is carried out by the second LPF in the first embodiment.

The second LPF 22 performs filter processing on the pixels (indicated by hatching), including the pixel of interest P(x, y), which are aligned in the 45-degree direction (the direction rotated 45 degrees counterclockwise from the horizontal direction), as shown in FIG. 3.

The third LPF 23 performs filter processing on the pixels (indicated by hatching), including the pixel of interest P(x, y), which are aligned in the 90-degree direction (vertical direction), as shown in FIG. 4.

Figure 5:
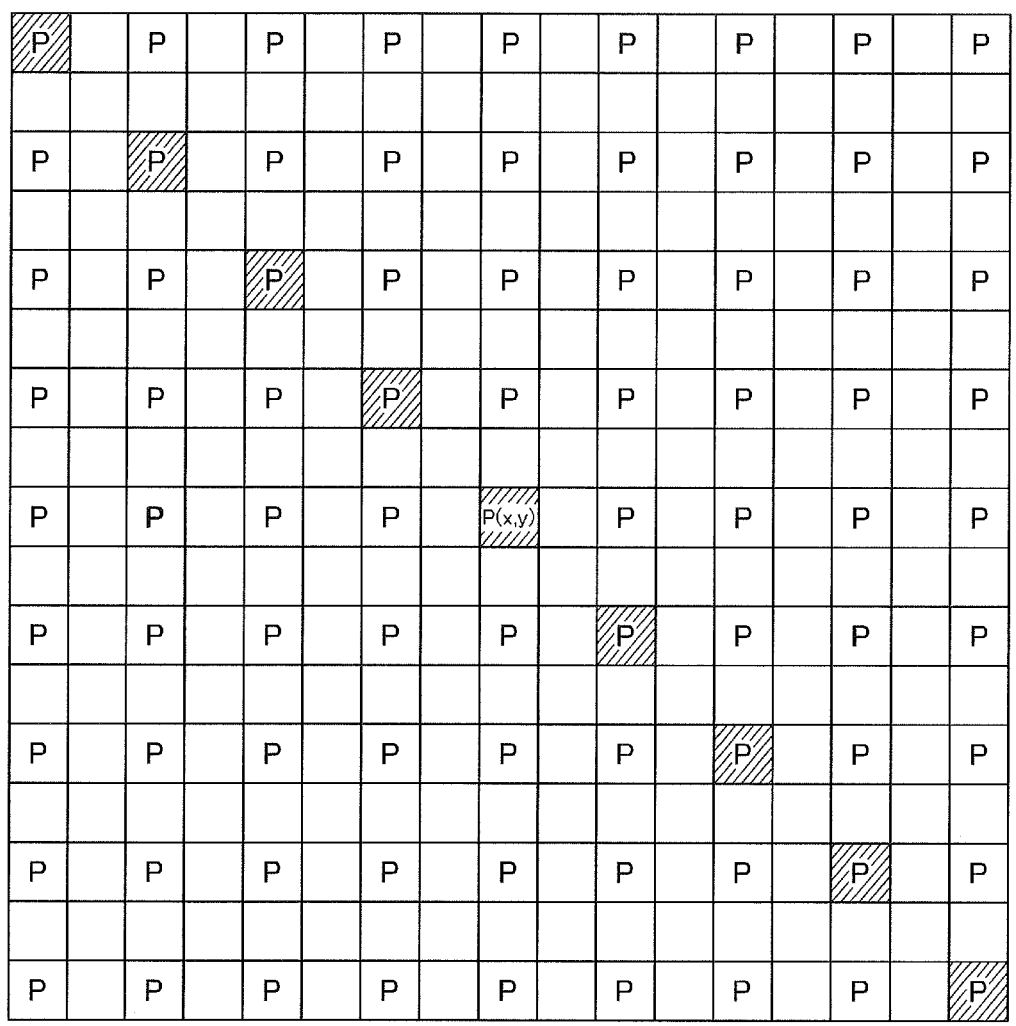
FIG. 5 is an explanatory diagram showing how filter processing is carried out by the fourth LPF in the first embodiment.

The fourth LPF 24 performs filter processing on the pixels (indicated by hatching), including the pixel of interest P(x, y), which are aligned in the 135-degree direction (the direction rotated 135 degrees counterclockwise from the horizontal direction), as shown in FIG. 5.

The one-dimensional LPFs 21 to 24 calculate the average pixel values La(x, y), Lb(x, y), Lc(x, y), Ld(x, y) in these directions by each calculating, for example, the simple average of the pixel values of the pixels aligned in the one dimensional direction (pixels used in the filtering process), including the pixel of interest, and output the calculated result as the LPF values in the corresponding one-dimensional directions.

The two-dimensional LPF 25 uses the pixels centered on the pixel of interest in the processing window to calculate a two-dimensional directional LPF value. The two-dimensional LPF 25 in the first embodiment is a peripheral low-pass filter.

Figure 6:
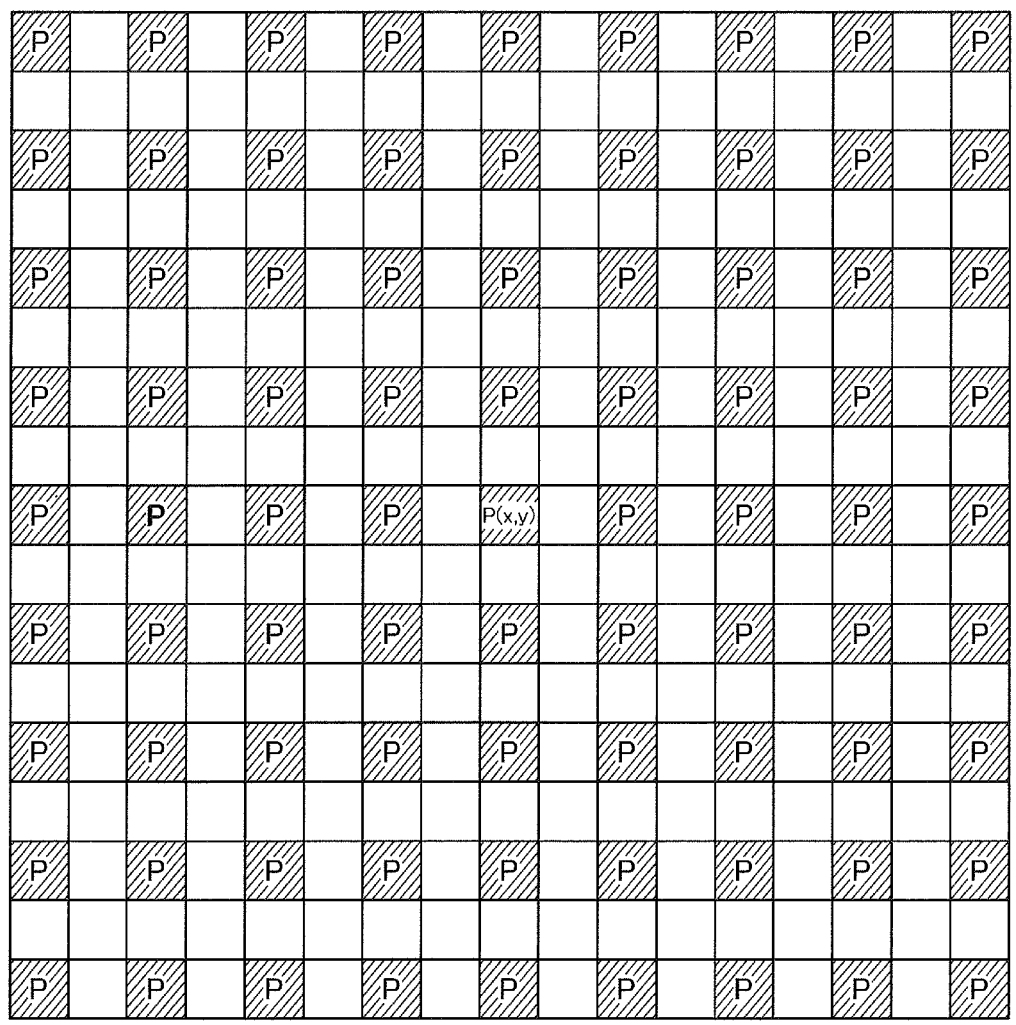
FIG. 6 is an explanatory diagram showing how filter processing is carried out by the two-dimensional LPF in the first embodiment.

FIG. 6 shows, by hatching, the pixels used in the LPF calculation on the processing window. In the example shown in FIG. 6, the pixel of interest and all the pixels of the same color as the pixel of interest in the 17×17 pixel processing window are used, and their average value Pf(x, y) is calculated as the two-dimensional directional LPF value according to formula (1).

[Mathematical expression 1]

$$Pf(x, y) = \frac{1}{81}\sum_{i=-4}^{4}\sum_{j=-4}^{4} P(x+2i)(y+2j) \quad (1)$$

In formula (1), (x, y) denotes the coordinates of the pixel of interest.

The coordinates of the top left corner of the image are (0, 0), the x coordinates of the pixels increase by 1 at every pixel interval to the right, and the y coordinates increase by 1 at every pixel interval downward.

The median filter 30 calculates the median value (central value) Pm(x, y) of the pixel value (signal level) $P(x, y)_t$ of the pixel of interest in the current frame of the image data output from the line memory 10, the pixel value $P(x, y)_{t-1}$ of the pixel of interest one frame before the current frame, which is output from the first frame memory 11, and the pixel value $P(x, y)_{t-2}$ of the pixel of interest two frames before the current frame, which is output from the second frame memory 12, and outputs the median value as a representative value of the pixel of interest.

The median filter 30 constitutes a representative value calculator.

That is, the median filter 30 calculates a representative value for the pixel of interest by carrying out filtering in the time axis direction on the basis of the pixel value P(x, y) of the pixel of interest in the frame of interest and one or more pixels in positions corresponding to the pixel of interest in one or more frames other than the frame of interest.

The representative value is thus a value obtained by performing filtering in the time axis direction on the pixel of interest and other pixel(s) in corresponding positions. Here, the representative value is a median value Pm(x, y).

The subscript 't' identifying the current frame will be omitted when there is no need to distinguish frames.

The noise level detector 32 calculates the absolute values ADa(x, y), ADb(x, y), ADc(x, y), and ADd(x, y) of the differences between the one-dimensional directional LPF values La(x, y) to Ld(x, y) output from the one-dimensional LPFs 21 to 24 and the representative value Pm(x, y) output from the median filter 30 and outputs the minimum value ADmin(x, y) of the calculated absolute values of the differences as the noise level NL(x, y) of the pixel of interest.

In other words, the noise level detector 32 calculates the absolute values ADa(x, y), ADb(x, y), ADc(x, y), ADd(x, y) of the differences between the respective one-dimensional directional LPF values La(x, y) to Ld(x, y) and the representative value Pm(x, y), and outputs the minimum value ADmin (x, y), among those of the calculated absolute difference values ADa(x, y), ADb(x, y), ADc(x, y), ADd(x, that satisfy a prescribed condition, as the noise level NL(x, y) of the pixel of interest.

The above absolute difference values ADa(x, y), ADb(x, y), ADc(x, y), ADd(x, y) are expressed by the following formulas (2a) to (2d).

$$ADa(x,y)=|La(x,y)-Pm(x,y)| \quad (2a)$$

$$ADb(x,y)=|Lb(x,y)-Pm(x,y)| \quad (2b)$$

$$ADc(x,y)=|Lc(x,y)-Pm(x,y)| \quad (2c)$$

$$ADd(x,y)=|Ld(x,y)-Pm(x,y)| \quad (2d)$$

The noise level detector 32 outputs the minimum value ADmin(x, y) among the calculated absolute difference values ADa(x, y) to ADd(x, y) as the noise level NL(x, y) of the pixel of interest.

The NR coefficient generator 34 receives the noise level NL(x, y) detected by the noise level detector 32 and generates a noise reduction coefficient (NR coefficient) Kf(x, y) according to a preset input-output characteristic.

In other words, the NR coefficient generator 34 receives the noise level NL(x, y) and generates a noise reduction coefficient Kf(x, y) corresponding to the noise level NL(x, y) according to a preset input-output characteristic.

Figure 7:
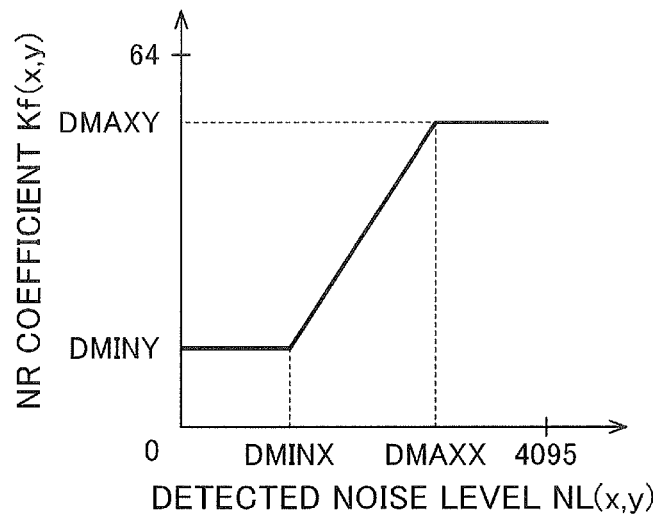
FIG. 7 is a graph showing an exemplary input-output characteristic of the NR coefficient generator 34 in the first embodiment.

An exemplary input-output characteristic is shown in FIG. 7. In the illustrated example, pixels in the input image data are assumed to take values from 0 to 4095 and the detected noise levels take corresponding values from 0 to 4095.

In the illustrated characteristic, the range of the NR coefficient for the detected noise level is defined in 65 steps from 0 to 64, with the strength of noise reduction increasing as the detected noise level Admin(x, y) increases and decreasing as the noise level Admin(x, y) decreases.

In the example shown in FIG. 7, in the range where the noise level NL(x, y) is less than DMINX, the NR coefficient Kf(x, y) is fixed at DMINY; in the range where the noise level NL(x, y) varies from DMINX to DMAXX, the NR coefficient Kf(x, y) increases from DMINY to DMAXY as the noise level NL(x, y) increases; in the range where the noise level NL(x, y) exceeds the DMAXX, the NR coefficient Kf(x, y) is fixed at DMAXY.

The values DMINX, DMAXX, DMINY, DMAXY that define the input-output characteristics are preset according to imaging conditions of the image input device.

The NR processor 36 uses the NR coefficient Kf(x, y) calculated for each pixel by the NR coefficient generator 34 to take a weighted sum of the pixel value P(x, y) of the pixel of interest and the two-dimensional directional LPF value Pf(x, y) pertaining to the pixel of interest as shown in the following formula (3).

$$Pb(x,y)=(Kf(x,y)\times Pf(x,y)+(64-Kf(x,y))\times P(x,y))/64 \quad (3)$$

That is, the NR processor 36 uses the NR coefficient Kf(x, y) to take a weighted sum of the pixel value P(x, y) of the pixel of interest and peripheral low-pass filter value Pf(x, y).

As expressed by formula (3), the two-dimensional directional LPF value Pf(x, y) is weighted by the NR coefficient Kf(x, y) and the pixel value P(x, y) is weighted by (64−Kf(x, y)).

The value Pb(x, y) obtained as a result of the calculation in formula (3) is output as a noise-reduced pixel value Pb(x, y) from the NR processor 36.

Because of this process, the NR coefficient Kf(x, for each pixel increases as the noise level NL(x, y)=ADmin(x, y) determined for the pixel increases, resulting in an increased mixing ratio of the two-dimensional LPF value Pf(x, y), enhancing the noise reduction (NR) effect. A large absolute difference minimum value ADmin(x, indicates noise, in which changes in pixel values are non-directional, rather than an edge, at which changes in the pixel values are directional.

In short, the NR processor 36 increases the weight applied to the peripheral low-pass filtered value Pf(x, y) as the noise reduction coefficient Kf(x, y) increases.

Although the foregoing series of processes has been described as being performed for only one of the four captured colors R, Gr, Gb, B in the processing window, the same processes are executed for each of the other colors.

In order to perform the same processes for each of the four captured colors, the LPFs 21 to 25, the median filter 30, the noise level detector 32, the NR coefficient generator 34, and the NR processor 36 may be provided separately (for each captured color), or the processing may be performed sequentially for the respective colors using the same circuits.

By performing the noise reduction process in this way, the noise level can be made uniform over the entire screen without loss of resolution, and accordingly it is possible to obtain a noise reduction effect with high image quality.

Figure 8A:
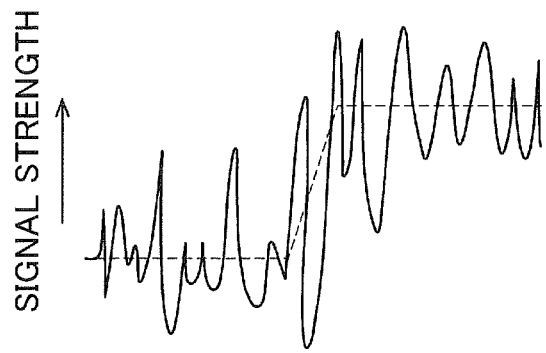
FIGS. 8(*a*) and 8(*b*) are explanatory diagrams showing image signals before and after noise reduction processing according to the first embodiment.
Figure 8B:
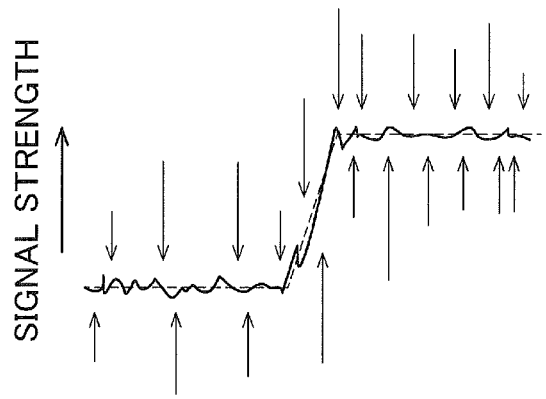

FIGS. 8(a) and 8(b) show exemplary image signals before and after the noise reduction process. For simplicity, they are shown as one-dimensional signals.

FIG. 8(a) shows the image signal input to the image processing device in FIG. 1. The signal indicated by the dotted line in the drawing shows the true variation in pixel value of the subject, but due to noise contamination occurring in the imaging element, the amplifier, or other analog circuits on the input side of the image processing device, the image signal is input as the signal indicated by the solid line.

FIG. 8(b) shows the image signal after the noise reduction process is performed on the signal in FIG. 8(a) according to the input-output characteristic in FIG. 7.

From FIGS. 8(a) and 8(b), it can be seen that the noise signal is suppressed while the edge originally included in the image is retained. This is because the noise level detector 32 is used to calculate the absolute values of the differences between the 0-degree to 135-degree one-dimensional LPF values and the representative value of the pixel of interest and determine the minimum difference value as the noise level NL(x, y) of the pixel of interest, so that the noise level is detected accurately, and noise reduction process is performed with a strength corresponding to the detected noise level.

As described above, the first embodiment takes a processing window consisting of a plurality of pixels centered on the pixel of interest, calculates a plurality of LPF values in mutually differing one-dimensional directions, each including the pixel of interest, in the processing window, also calculates a two-dimensional directional LPF value including the pixel of interest in the processing window, calculates a representative value pertaining to the pixel of interest over a plurality of frames, calculates the absolute values of the differences between the one-dimensional directional LPF values and the representative value, detects the minimum value among the calculated absolute difference values as the noise level NL(x, y) of the pixel of interest, generates an NR coefficient Kf(x, y) corresponding to the noise level NL(x, y), according to a preset input-output characteristic, and then performs noise reduction by using the generated NR coefficient Kf(x, y) to take a weighted sum of the pixel value P(x, y) of the pixel of interest and the two-dimensional directional LPF value Pf(x, y).

Because of the configuration that enables the noise level to be detected accurately, it becomes possible to perform noise reduction without loss of resolution and obtain a high quality image. In addition, while noise reduction performance and edge preservation performance are improved by determining a representative value, e.g., a median value, in the time axis direction, the number of pixels referred to in the time axis direction is minimized, the invention can be implemented in a circuit of a small size.

Furthermore, it is so configured that the noise level NL(x, y) of the pixel of interest is detected and is reduced without distinguishing between edges originally present in the image and noise added by the imaging system. Accordingly, in comparison with a configuration that uses a Sobel filter, for example, to discriminate between edges and noise and performs noise reduction exclusively on noise, an image with more uniform granularity and a lower noise level can be output.

In addition, according to the first embodiment, the median value of the pixel values of the pixel of interest in the current frame, the pixel of interest in the preceding frame, and the pixel of interest in the frame two frames earlier is used only to detect the noise level, and is not used in the weighted summing process carried out by the NR processor 36. With this configuration, only pixels in the current frame are used to form the noise reduced image, so that even when a subject that moves between the preceding frame and the current frame is imaged, since only the pixels in the current frame are used, the noise reduction process can be performed without causing blurring, even when the subject is moving.

In the above example, NR coefficients are generated by use of the same input-output characteristic for all the captured colors of the image captured by a single-element color sensor, but the invention is not limited to this scheme. It may be configured to use different input-output characteristics for different captured colors in the input image (one for each color component). This enables noise reduction to be performed responsive to the characteristics of the image input system or image transmission system for each color component, so that noise reduction can be optimized responsive to the characteristics of the input image.

That is, the input image P(x, y) includes a plurality of color components, and the NR coefficient generator 34 generates a noise reduction coefficient Kf(x, y) for each color component by use of an input-output characteristic responsive to the characteristics of the input image P(x, for each color component of the input image P(x, y).

Alternatively, the input image P(x, y) includes a plurality of color components, and a correction coefficient Kf(x, y) is generated for each color component, using different input-output characteristics according to the characteristics of the input image P(x, y). In this case, the correction coefficients are noise reduction coefficients Kf(x, y).

In the example above, the one-dimensional LPFs 21 to 24 use all the pixels of the same color positioned in the processing window and aligned in a prescribed direction to calculate LPF values, and the two-dimensional LPF 25 uses all the pixels of the same color in the processing window to calculate an LPF value, but the invention is not limited to this scheme. It may also be configured to select only pixel values relatively close to the median value calculated in the median filter 30 (i.e., within a prescribed level difference) and use them to calculate the LPF values. With this configuration, when a region with features obviously differing from the pixel of interest is included in the processing window, the features of the differing region can be excluded from the calculations, enabling noise reduction with higher resolution.

That is, the one-dimensional low-pass filters 21 to 24 and the peripheral low-pass filter 25 can be configured to select only pixel values in the processing window within a prescribed level difference from the representative value and then determine the respective low-pass filtered values.

In the example above, the noise level detector 32 detects the noise level NL(x, y) by estimating the noise level NL(x, y) to be the minimum value of the absolute differences between the one-dimensional directional LPF values and the representative value (median value) of the pixel of interest, but the invention is not limited to this scheme. It may also be configured to use the minimum value and maximum value of the LPF values calculated by the first to fourth one-dimensional LPFs 21 to 24, and when the filtering direction corresponding to the minimum value is orthogonal to the filtering direction corresponding to the maximum value, the filtering direction corresponding to the minimum value is determined to be an edge direction and the minimum value is estimated to be the noise level.

In this case, when the filtering direction corresponding to the minimum value is not orthogonal to the filtering direction corresponding to the maximum value, for example, whether or not the filtering direction corresponding to the second smallest value, instead of the minimum value, is orthogonal with the filtering direction corresponding to the maximum value is determined, and when this direction is orthogonal, processing proceeds with the second smallest value being treated as the noise level. When the filtering direction corresponding to the second smallest value is not orthogonal to the filtering direction corresponding to the maximum value either, the third smallest value is checked. More generally, the values are sequentially checked up to the N-th smallest value (N being an integer equal to or greater than 2), and processing is carried out by using the first absolute difference value satisfying the condition of orthogonality to the filtering direction corresponding to the maximum value as an estimate of the noise level. When the condition of orthogonality to the filtering direction corresponding to the maximum value is not satisfied even after the checking has been carried out through the N-th smallest value, the noise level detector 32 returns to the original rule and performs processing by assuming the minimum value to be the noise level.

This process can be described as a process in which, from the plurality of one-dimensional directional LPF values, the value with the minimum absolute difference from the representative value is extracted from among those satisfying a prescribed condition and is used as the noise level.

Detecting the noise level NL(x, y) from a plurality of edge directions in this way reduces the possibility of the absolute value of the noise level in an incorrect direction being selected due to the effect of random noise, and enables a more accurate noise level to be calculated.

In the example described above, the NR coefficient calculated in the NR coefficient generator 34 is calculated in 65 steps, but the invention is not limited to this scheme. The number of NR coefficient steps may be decided arbitrarily according to factors such as the bit width of the input image.

In the above example, each of the one-dimensional directional LPF values and the two-dimensional directional LPF value are calculated as a simple average of the pixel values of the pixel of interest and neighboring pixels, but the invention is not limited to this scheme. It may also be configured to calculate the average by weighting each of the pixels in a neighborhood of the pixel of interest according to its distance from the pixel of interest. This enables the calculation to give greater weight to features of pixels closer to the pixel of interest, and enables more accurate noise level detection, especially under low noise conditions.

In the above example, the NR processor 36 calculates a weighted sum of the pixel value P(x, y) of the pixel of interest and the two-dimensional directional LPF value on the basis of the NR coefficient Kf(x, y), but the invention is not limited to this scheme. Instead of the two-dimensional directional LPF value, the one-dimensional directional LPF value (one of La(x, y), Lb(x, y), Lc(x, y), and Ld(x, y)) in the direction corresponding to the minimum absolute difference value may be used in the calculation of the weighted sum. The weighted sum in this case uses values filtered in a narrower range than when the two-dimensional directional LPF value Pf(x, y) is used. This is particularly advantageous in that the resolution can be fully maintained when the input image includes relatively little noise.

In short, it is only necessary to determine an LPF value (peripheral low-pass filtered value) using the pixel of interest and neighboring pixels and to have the NR processor 36 use this value for the calculation of the weighted sum with the representative value of the pixel of interest.

In other words, the two-dimensional LPF 25 outputs a low-pass filtered value using the pixel of interest and neighboring pixels in the processing window as the peripheral low-pass filtered value.

In the above example, the two-dimensional directional LPF value is obtained by an average value calculation process using formula (1) on pixels of the same color in a 17×17 pixel processing window, but the invention is not limited to this scheme. It may use a window of a different size on the basis of device implementation cost, the S/N ratio of the input image signal, or other factors. In this case, by selecting a number of pixels such that the denominator in formula (1) is a power of two, a general-purpose divider (a divider capable of operating with any divisor) can be eliminated.

In the above example, division by 64 is performed in the NR process using formula (3), but division by a value other than 64 may be performed instead. When the divisor is a power of two, however, if the process is implemented in hardware, the division may be performed by a bit shift, so that a general-purpose divider is not necessary, and if the process is implemented in software, the calculation can be speeded up.

A median value obtained by the median filter 30 has been used as the representative value of the pixel of interest, but instead, an average value can be determined from the pixel value of the pixel of interest in the current frame in the image data, which is output from the line memory 10, the pixel value of the pixel of interest one frame before, which is output from the first frame memory 11, and the pixel value of the pixel of interest two frames before, which is output from the second frame memory 12, and this value may be used as the representative value. In this case, the representative value is an average value. For this purpose, the representative value calculator calculates an average value.

A value other than a median value or an average value, obtained as a result of filtering in the time axis direction may be used as the representative value. For example, a value obtained by using a recursive filter in the time axis direction may be used as the representative value. In this case, the representative value is a value calculated by a recursive filter. The representative value calculator is therefore a recursive filter.

Although the pixel value in the current frame, the pixel value one frame before, and the pixel value two frames before have been determined, the representative value may be determined by additionally using pixel values three or more frames before. That is, it is only necessary to use a value obtained as a result of filtering in the time axis direction using the pixel value of the pixel of interest in the current frame and pixels with the same two-dimensional coordinates as the pixel of interest in one or more frames other than the current frame.

When motion (displacement) occurs between image frames, the motion may be compensated for before filtering in the time axis direction. For example, the pixel of interest in the current frame and one or more pixels (corresponding to the pixel of interest) at positions (motion origins) where (a pixel expressing the same image portion as) the pixel of interest is estimated to have been positioned in one or more past frames may be used to determine the representative value. In short, the pixel of interest and corresponding pixels in past frames may be used.

Alternatively, when motion occurs, the pixel value of the pixel of interest in the current frame may be used as the representative value, without using pixel values of the pixel of interest in frames other than the current frame.

Second Embodiment

Figure 9:
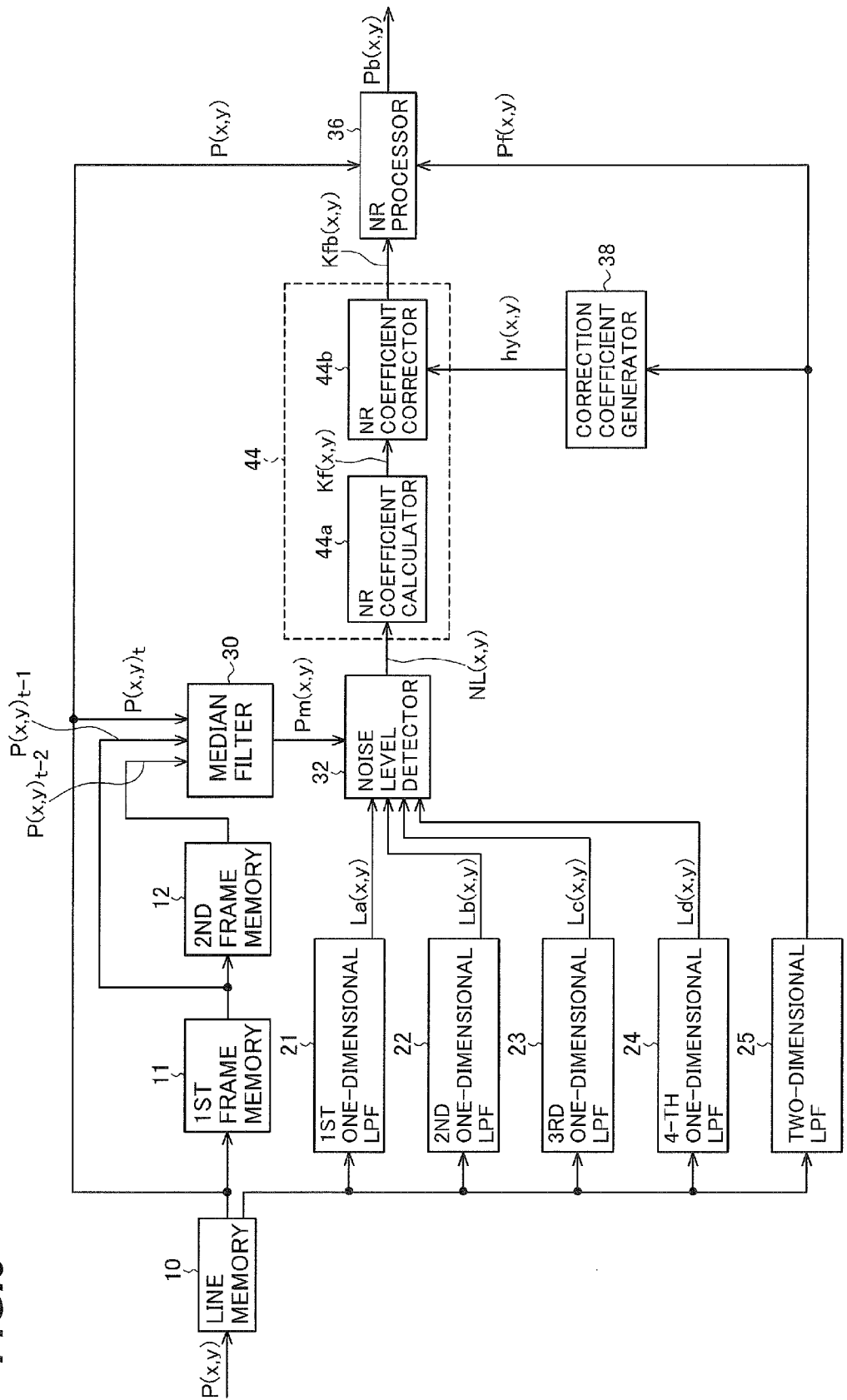
FIG. 9 is a block diagram showing an image processing device according to a second embodiment of the invention.

FIG. 9 shows the functional configuration of the image processing device in the second embodiment of the invention. In FIG. 9, elements similar to the elements in FIG. 1 have the same reference characters.

The elements similar to the elements in the first embodiment are the line memory 10, the frame memories 11, 12, the median filter 30, the one-dimensional LPFs 21, 22, 23, and 24, the two-dimensional LPF 25, the noise level detector 32, and the NR processor 36.

The second embodiment differs from the first embodiment in that it includes a correction coefficient generator 38 and is provided with an NR coefficient generator 44 in place of the NR coefficient generator 34 in FIG. 1.

The NR coefficient generator 44 includes an NR coefficient calculator 44a and an NR coefficient corrector 44b.

The NR coefficient calculator 44a is configured similarly to the NR coefficient generator 34 in FIG. 1 and generates an NR coefficient Kf(x, y) by a like method.

The NR coefficient corrector 44b corrects the NR coefficient Kf(x, y) output from the NR coefficient calculator 44a on the basis of a correction coefficient hy(x, y) output from the correction coefficient generator 38, thereby generating a corrected NR coefficient Kfb(x, y).

Specifically, the NR coefficient Kf(x, y) is multiplied by the correction coefficient hy(x, y) and divided by 64 to calculate the corrected NR coefficient Kfb(x, y), as shown by the following formula (4).

$$Kfb(x,y) = Kf(x,y) \times hy(x,y)/64 \quad (4)$$

Thus, the NR coefficient generator 44 generates the NR coefficient Kfb(x, y) on the basis of the noise level NL(x, y) detected by the noise level detector 32 and the correction coefficient hy(x, y) generated by the correction coefficient generator 38. By calculating the corrected NR coefficient Kfb(x, y) according to formula (4), the corrected NR coefficient Kfb(x, y) decreases as the correction coefficient hy(x, y) decreases.

More specifically, the correction coefficient hy(x, y) decreases as the peripheral low-pass filtered value Pf(x, y) decreases in a range where the peripheral low-pass filtered value Pf(x, y) is less than a prescribed value, and the corrected noise reduction coefficient Kfb(x, y) decreases as the correction coefficient hy(x, y) decreases.

The correction coefficient generator 38 generates the correction coefficient hy(x, y) responsive to the brightness (brightness or intensity for each color component) of the image in the surrounding region centered on each pixel, as represented by the output Pf(x, y) of the two-dimensional LPF 25.

Figure 10:
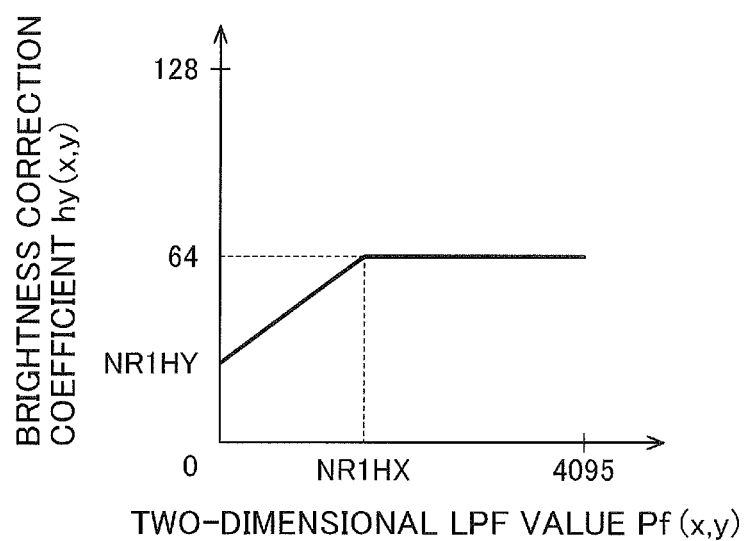
FIG. 10 is a graph showing an exemplary input-output characteristic of the correction coefficient generator in the second embodiment.

An exemplary relationship (input-output characteristic) between the value of the output Pf(x, y) of the two-dimensional LPF 25 input to the correction coefficient generator 38 and the correction coefficient hy(x, y) is shown in FIG. 10. In the illustrated example, the two-dimensional LPF value Pf(x, y) takes values from 0 to 4095, while the correction coefficient takes 129-step values from 0 to 128. When no correction is applied (when the corrected coefficient Kfb(x, y) is made equal to the coefficient Kf(x, y) before the correction), the correction coefficient value is 64. This is because the correction is performed by multiplying the NR coefficient Kf(x, y) by the quotient of the correction coefficient value divided by 64.

In FIG. 10, the symbols NR1HX and NR1HY indicate preset values for defining the input-output characteristic. Of these, NR1HX is an upper limit value determining the upper limit of the range in which the NR coefficient is corrected; as the upper limit value NR1HX increases, the correction range of the NR coefficient is widened. NR1HY is a value that determines the strength of the correction; as NR1HY decreases, the correction for reducing the NR coefficient value becomes stronger.

When the input-output characteristic in FIG. 10 is used, if the two-dimensional LPF value Pf(x, y) is less than the upper limit value NR1HX, that is, in a dark portion of the image, the NR coefficient output from the NR coefficient generator 44 can be made smaller to weaken the noise reduction effect.

Instead of setting the correction coefficient hy(x, to a value less than 64 in dark portions as shown in FIG. 10, it is also possible to set the correction coefficient hy(x, y) to a value greater than 64 in bright portions (e.g., in a range beyond a prescribed lower limit). In addition, the correction coefficient hy(x, y) may be set to a small value in dark portions and to a large value greater than 64 in bright portions.

As described above, the second embodiment makes it possible to change the degree of noise reduction in bright portions (portions intense in each color) or dark portions (portions weak in each color), so that it is possible to prevent degradation of image quality due to differences in brightness (color intensity) of the input image, such as the blurring of portions with a low signal level (dark portions) when the NR coefficient is adjusted to suit bright portions of the input image.

In the example given in the second embodiment, the correction can be switched in 129 steps on the basis of the two-dimensional LPF value Pf(x, y), but the invention is not limited to this scheme. The number of switching steps may be changed according to characteristics of the input image that depend on the characteristics of the imaging device, for example. Also, in formula (4), the coefficient Kf(x, y) is multiplied by the quotient of the correction coefficient hy(x, y) divided by 64, but the invention is not limited to this scheme either. The divisor may be a value other than 64. When the divisor is a power of two, however, the value by which the coefficient Kf(x, y) is multiplied can be determined by a bit shift, so that if this process is carried out in hardware, a general-purpose divider can be omitted, reducing the size of the circuit, and if the process is carried out in software, the processing can be speeded up.

In the example given in the second embodiment, the correction on the basis of the pixel value of each color (intensity of each color) in an image captured by a single-element color sensor is performed in the same way for all captured colors, but the invention is not limited to this scheme. A correction coefficient may be generated with input-output characteristics differing from color to color (for each color component). This enables the noise reduction process to be performed according to the characteristics of the image input system or image transmission system for each color component, so that an optimal noise reduction process can be performed according to the characteristics of the input image.

In order to generate a separate correction coefficient for each color component, the LPFs 21 to 25, the median filter 30, the noise level detector 32, the NR coefficient generator 44, the NR processor 36, and the correction coefficient generator 38 shown in FIG. 9 may be provided separately (for each captured color), or alternatively, the processing may be performed sequentially for the respective colors using the same circuits, as noted in the first embodiment.

Third Embodiment

Figure 11:
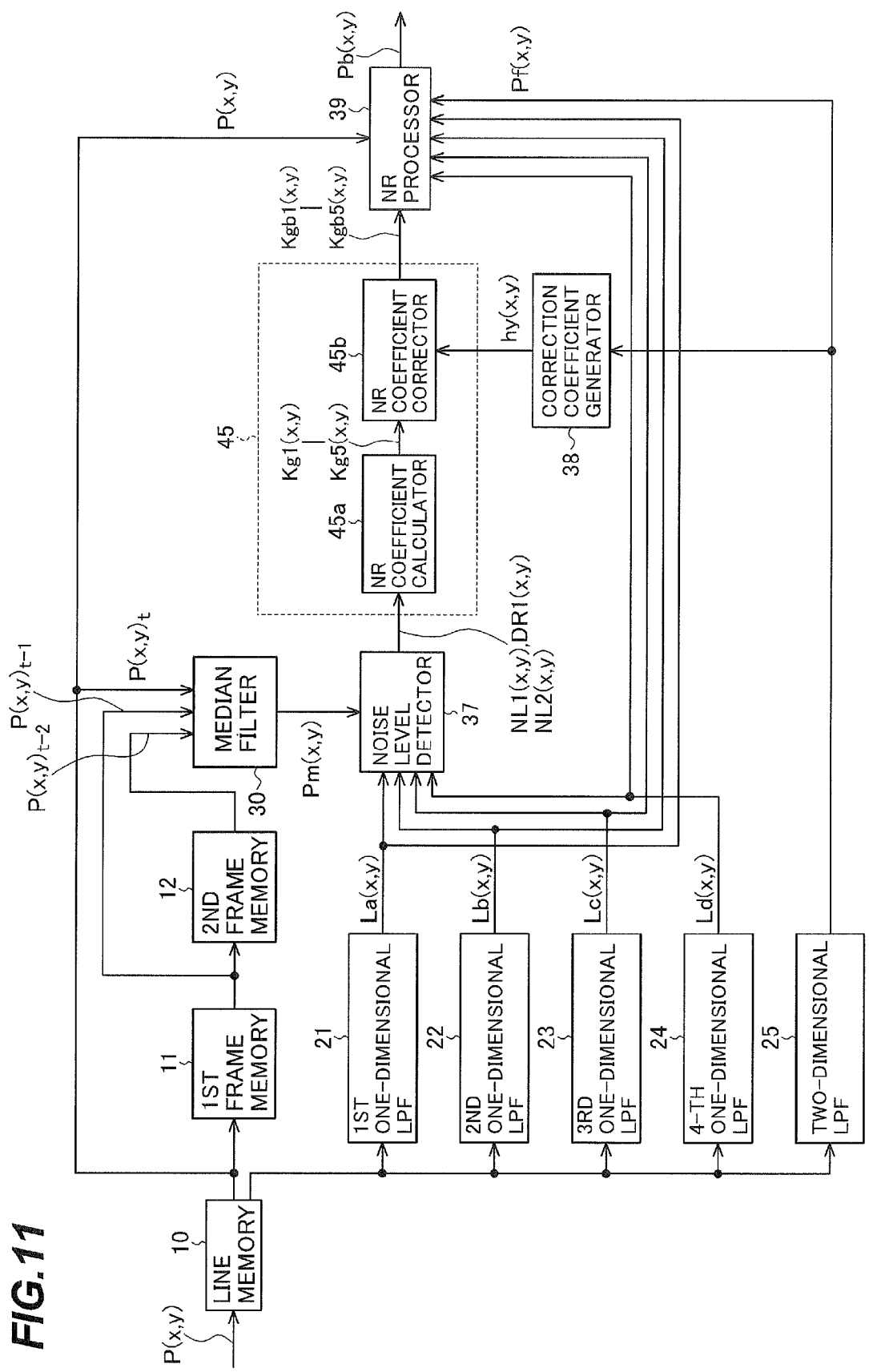
FIG. 11 is a block diagram showing an image processing device according to a third embodiment of the invention.

FIG. 11 shows the functional configuration of the image processing device in the third embodiment of the invention. In FIG. 11, elements similar to the elements in FIG. 9 have the same reference characters.

The elements similar to the elements in the second embodiment (FIG. 9) are the line memory 10, the frame memories 11, 12, the median filter 30, the one-dimensional LPFs 21, 22, 23, and 24, and the two-dimensional LPF 25.

The image processing device in the third embodiment is provided with a noise level detector 37, an NR processor 39, and an NR coefficient generator 45, in place of the noise level detector 32, the NR processor 36, and the NR coefficient generator 44 in FIG. 9. The noise level detector 37, the NR processor 39, and the NR coefficient generator 45 are substantially the same as the noise level detector 32, the NR processor 36, and the NR coefficient generator 44, but differ as follows. In particular, the NR processor 39 differs from the NR processor 36 in that it refers to the outputs from the first one-dimensional LPF to fourth one-dimensional LPF, as set forth in detail below.

The NR coefficient calculator 44a in the second embodiment calculates only the NR coefficient Kf(x, y), but the NR coefficient calculator 45a in the third embodiment calculates five types of NR coefficients: NR coefficients Kg1(x, y) to Kg5 (x, y). The NR coefficient Kg1 (x, y) is a coefficient for the value output from the first one-dimensional LPF, the NR coefficient Kg2(x, y) is a coefficient for the value output from the second one-dimensional LPF, the NR coefficient Kg3(x, y) is a coefficient for the value output from the third one-dimensional LPF, the NR coefficient Kg4(x, y) is a coefficient applied to the value output from the fourth one-dimensional LPF, and the NR coefficient Kg5(x, y) is a coefficient for the value output from the two-dimensional LPF.

The noise level detector 37 in the third embodiment calculates absolute difference values ADa(x, y) to ADd(x, y) according to formulas (2a) to (2d), outputs the smallest of the calculated absolute difference values as a noise level NL1(x, y) of the pixel of interest, and outputs the second smallest value as a noise level NL2(x, y).

It also outputs the direction of the one-dimensional LPF corresponding to noise level NL1(x, y) as DR1(x, y). One of the one-dimensional LPF numbers (1 to 4) is stored in DR1(x, y).

In other words, the noise level detector 37 calculates absolute values ADa(x, y) to ADd(x, y) of differences between the one-dimensional directional low-pass filtered values and the representative value, outputs the smallest of the calculated absolute difference values ADa(x, y) to ADd(x, y) satisfying a prescribed condition as a noise level NL1(x, y) of the pixel of interest, outputs the direction of the corresponding one-dimensional directional low-pass filter as DR1(x, y), and outputs the second smallest value as a noise level NL2(x, y) of the pixel of interest.

From the noise levels NL1(x, y) and NL2(x, y) and the direction DR1(x, y), the NR coefficient calculator 45a in the third embodiment calculates the NR coefficient Kg1(x, y) for the value output from the first one-dimensional LPF, the NR coefficient Kg2(x, y) for the value output from the second one-dimensional LPF, the NR coefficient Kg3(x, y) for the value output from the third one-dimensional LPF, the NR coefficient Kg4(x, y) for the value output from the fourth one-dimensional LPF, and the NR coefficient Kg5(x, y) for the value output from the two-dimensional LPF.

From the smallest value NL1(x, y), the direction DR1(x, y) corresponding thereto, and the second smallest value NL2(x, y), the NR coefficient calculator 45a generates noise reduction coefficients for use in taking a weighted sum of the pixel value of the pixel of interest, the peripheral low-pass filtered value Pf(x, y), and the plurality of one-dimensional low-pass filtered values La(x, y) to Ld(x, y).

In the calculation of the NR coefficients Kg1(x, y) to Kg5 (x, y), first the NR coefficients corresponding to the one-dimensional LPFs in directions differing from the direction DR1(x, y) are all set to 0. For example, when the direction DR1(x, y) is 1, the NR coefficients Kg2(x, y) to Kg4(x, y) are set to 0.

Figure 12:
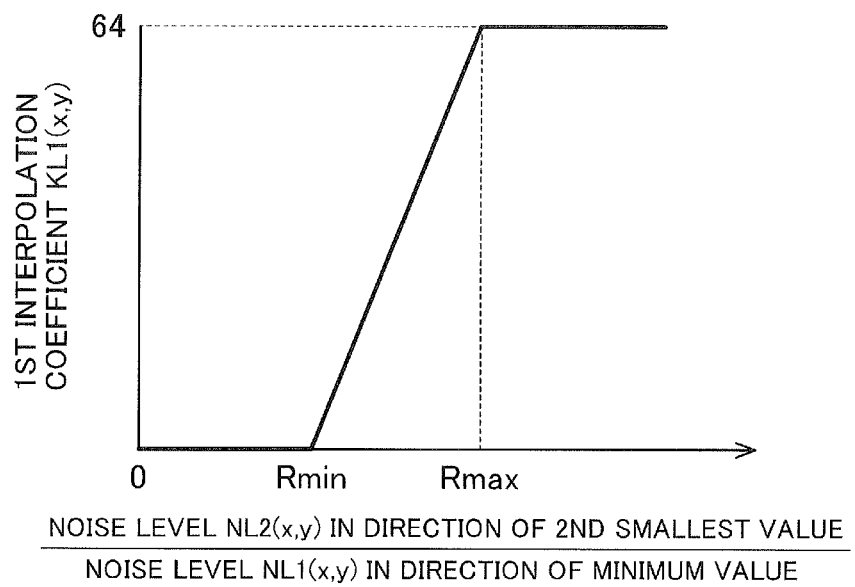
FIG. 12 is a graph showing an exemplary first interpolation coefficient characteristic for the noise levels in the direction of minimum noise level and in the direction of the second smallest noise level in the third embodiment.

Next, a first interpolation coefficient KL1(x, y) for interpolation between the output value of the one-dimensional LPF corresponding to the direction DR1(x, y) and the output of the two-dimensional LPF is calculated. As shown in FIG. 12, the first interpolation coefficient KL1(x, y) is calculated by referring to the ratio between the noise level NL2(x, y) in the direction producing the second smallest value and the noise level NL1(x, y) in the direction producing the minimum value (the ratio of the former to the latter). When the ratio is equal to or less than R1min, the first interpolation coefficient KL1(x, y) is set to the minimum value (e.g., 0); when the ratio is equal to or greater than R1max, the first interpolation coefficient KL1(x, y) is set to the maximum value (e.g., 64). When the ratio is between R1 min and R1 max, the first interpolation coefficient KL1(x, y) is set to a value that increases linearly between the minimum value and the maximum value.

Figure 13:
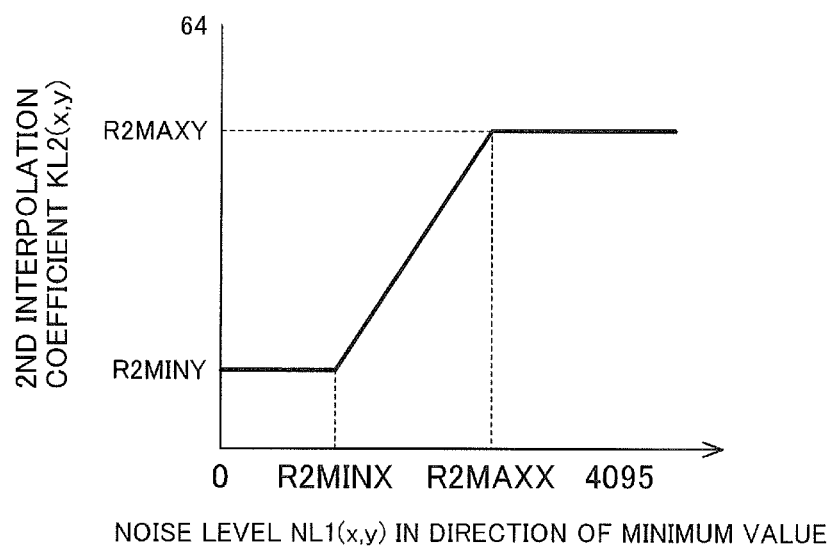
FIG. 13 is a graph showing an exemplary second interpolation coefficient characteristic for the noise level in the direction of minimum noise level in the third embodiment.

Next, a second interpolation coefficient KL2(x, y) for interpolation between the output value of a one-dimensional LPF or the two-dimensional LPF and the pixel value of the pixel of interest is calculated. As shown in FIG. 13, when the noise level NL1(x, y) in the direction producing the minimum value is equal to or less than R2MINX, the second interpolation coefficient KL2(x, y) is set to R2MINY; when the noise level NL1(x, y) in the direction producing the minimum value is equal to or greater than R2MAXX, the second interpolation coefficient KL2(x, y) is set to R2MAXY. When the noise level NL1(x, y) in the direction producing the minimum value is between R2MINX and R2MAXX, the coefficient is set to a value that increases linearly between R2MINY and R2MAXY.

Finally, an NR coefficient KgN(x, y) (where N is an integer from 1 to 4) corresponding to the one-dimensional LPF in the direction that produces the minimum value is calculated according to formula (5), and the NR coefficient Kg5(x, y) corresponding to the two-dimensional LPF is calculated according to formula (6).

$$KgN(x,y) = KL1(x,y) \times KL2(x,y) \div 64 \quad (5)$$

$$Kg5(x,y) = (64 - KL1(x,y)) \times KL2(x,y) \div 64 \quad (6)$$

The NR coefficient corrector 45b in the third embodiment multiplies each of NR coefficients Kg1(x, y) to Kg5(x, y) by the correction coefficient hy(x, y) and then divides the products by 64, thereby calculating corrected NR coefficients Kgb1(x, y) to Kgb5(x, y), in the same way as in formula (4).

The NR processor 39 in the third embodiment takes a weighted sum of the pixel value of the pixel of interest, the output values of all the one-dimensional LPFs, and the output value of the two-dimensional LPF according to formula (7)

$$Pb(x, y) = Kgb1(x, y) \times La(x, y) + Kgb2(x, y) \times Lb(x, y) + \quad (7)$$
$$Kgb3(x, y) \times Lc(x, y) + Kgb4(x, y) \times Ld(x, y) +$$
$$Kgb5(x, y) \times Pf(x, y) + (1 - Kgb1(x, y) - Kgb2(x, y) -$$
$$Kgb3(x, y) - Kgb4(x, y) - Kgb5(x, y)) \times P(x, y)$$

The value Pb(x, y) obtained from the operation in formula (7) is output from the NR processor 39 as a noise reduced pixel value Pb(x, y).

In short, the NR processor 39 takes a weighted sum of the pixel value of the pixel of interest, a peripheral low-pass filtered value, and a plurality of one-dimensional low-pass filtered values in accordance with the noise reduction coefficients.

Although the invention has been described as an image processing device, the image processing method implemented in the image processing device also constitutes part of the present invention. In addition, an image processing program that causes a computer to execute the image processing method also constitutes part of the present invention.

Embodiments of the invention have been described above, but the invention is not limited to these embodiments.

Reference Characters

10 line memory, 11 first frame memory, 12 second frame memory, 21-24 one-dimensional LPF, 25 two-dimensional LPF, 32, 37 noise level detector, 34 NR coefficient generator, 36, 39 NR processor, 38 correction coefficient generator, 30 median filter, 44, 45 NR coefficient generator, 44a, 45a NR coefficient calculator, 44b, 45b NR coefficient corrector.

What is claimed is:

1. An image processing device for receiving a moving picture including a time sequence of frames, the image processing device comprising:
    a plurality of one-dimensional low-pass filters calculating respective low-pass filtered values using a pixel of interest and pixels aligned in different one-dimensional directions with respect to the pixel of interest, in a processing window including a plurality of pixels centered on the pixel of interest, in a frame of interest;
    a peripheral low-pass filter outputting, as a peripheral low-pass filtered value, a low-pass filtered value obtained using the pixel of interest and neighboring pixels thereof in the processing window;
    a representative value calculator for performing filtering in a time axis direction, based on a pixel value of the pixel of interest in the frame of interest and a pixel value of a pixel in a position corresponding to the pixel of interest in at least one frame other than the frame of interest, to obtain a representative value for the pixel of interest;
    a noise level detector for calculating absolute values of differences between the representative value and each of the one-dimensionally low-pass filtered values and outputting, as a noise level of the pixel of interest, a minimum value among those of the calculated absolute differences that satisfy a predetermined condition;
    an NR coefficient generator for receiving the noise level and generating a noise reduction coefficient corresponding to the noise level according to a predetermined input-output characteristic; and
    an NR processor for using the noise reduction coefficient to take a weighted sum of the pixel value of the pixel of interest and the peripheral low-pass filtered value.

2. The image processing device of claim 1, wherein the NR processor increases the weight of the peripheral low-pass filtered value as the noise reduction coefficient increases.

3. The image processing device of claim 2, wherein the representative value is a median value.

4. The image processing device of claim 2, wherein the representative value is a value calculated by a recursive filter.

5. The image processing device of claim 2, wherein the peripheral low-pass filter is a two-dimensional low-pass filter.

6. The image processing device of claim 2, wherein the one-dimensional low-pass filters and the peripheral low-pass filter obtain respective low-pass filtered values by selecting only pixel values that are within a prescribed level difference from the representative value within the processing window.

7. The image processing device of claim 2, further comprising a correction coefficient generator for generating a correction coefficient based on the peripheral low-pass filtered value, wherein the NR coefficient generator generates the NR coefficient based on the noise level detected by the noise level detector and the correction coefficient generated by the correction coefficient generator.

8. The image processing device of claim 7, wherein:
    the correction coefficient decreases together with the peripheral low-pass filtered value in a range in which the peripheral low-pass filtered value is lower than a prescribed value; and
    the noise reduction coefficient decreases as the correction coefficient decreases.

9. The image processing device of claim 2, wherein:
    the noise level detector calculates absolute values of differences between the representative value and each of the one-dimensionally low-pass filtered values and outputs, as a noise level of the pixel of interest, a minimum value among those of the calculated absolute differences that satisfy a predetermined condition, a direction of the corresponding one-dimensional low-pass filter, and a second smallest value among those of the calculated absolute differences that satisfy the predetermined condition;
    from the minimum value, the direction of the corresponding one-dimensional low-pass filter, and the second smallest value, the NR coefficient generator generates noise reduction coefficients for use in taking a weighted sum of the pixel value of the pixel of interest, the peripheral low-pass filtered value, and the plurality of one-dimensionally low-pass filtered values; and
    the NR processor takes the weighted sum of the pixel value of the pixel of interest, the peripheral low-pass filtered value, and the plurality of one-dimensionally low-pass filtered values according to the noise reduction coefficients.

10. The image processing device of claim 1, wherein the input image includes a plurality of color components, and the NR coefficient calculator generates a noise reduction coefficient for each of the color components in the input image, using an input-output characteristic corresponding to a characteristic of the input image for each of the color components.

11. The image processing device of claim 7, wherein the input image includes a plurality of color components, and the correction coefficient is generated separately for each of the color components of the input image, using different input-output characteristics corresponding to characteristics of the input image.

12. The image processing device of claim 3, wherein the peripheral low-pass filter is a two-dimensional low-pass filter.

13. The image processing device of claim 5, wherein the one-dimensional low-pass filters and the peripheral low-pass filter obtain respective low-pass filtered values by selecting only pixel values that are within a prescribed level difference from the representative value within the processing window.

14. The image processing device of claim 12, wherein the one-dimensional low-pass filters and the peripheral low-pass filter obtain respective low-pass filtered values by selecting only pixel values that are within a prescribed level difference from the representative value within the processing window.

15. The image processing device of claim 5, further comprising a correction coefficient generator for generating a correction coefficient based on the peripheral low-pass filtered value, wherein the NR coefficient generator generates the NR coefficient based on the noise level detected by the noise level detector and the correction coefficient generated by the correction coefficient generator.

16. The image processing device of claim 6, further comprising a correction coefficient generator for generating a correction coefficient based on the peripheral low-pass filtered value, wherein the NR coefficient generator generates the NR coefficient based on the noise level detected by the noise level detector and the correction coefficient generated by the correction coefficient generator.

17. An image processing method for receiving a moving picture including a time sequence of frames, the image processing method comprising:
- a plurality of one-dimensional low-pass filtering steps calculating respective low-pass filtered values using a pixel of interest and pixels aligned in different one-dimensional directions with respect to the pixel of interest, in a processing window including a plurality of pixels centered on the pixel of interest, in a frame of interest;
- a peripheral low-pass filtering step outputting, as a peripheral low-pass filtered value, a low-pass filtered value obtained using the pixel of interest and neighboring pixels thereof in the processing window;
- a representative value calculating step for performing filtering in a time axis direction, based on a pixel value of the pixel of interest in the frame of interest and a pixel value of a pixel in a position corresponding to the pixel of interest in at least one frame other than the frame of interest, to obtain a representative value for the pixel of interest;
- a noise level detecting step for calculating absolute values of differences between the representative value and each of the one-dimensionally low-pass filtered values and outputting, as a noise level of the pixel of interest, a minimum value among those of the calculated absolute differences that satisfy a predetermined condition;
- an NR coefficient generating step for receiving the noise level and generating a noise reduction coefficient corresponding to the noise level according to a predetermined input-output characteristic; and
- an NR processing step for using the noise reduction coefficient to take a weighted sum of the pixel value of the pixel of interest and the peripheral low-pass filtered value.

18. The image processing method of claim 17, wherein the NR processing step increases the weight of the peripheral low-pass filtered value as the noise reduction coefficient increases.

19. The image processing method of claim 18, further comprising a correction coefficient generating step for generating a correction coefficient based on the peripheral low-pass filtered value, wherein the NR coefficient generating step generates the NR coefficient based on the noise level detected by the noise level detecting step and the correction coefficient generated by the correction coefficient generating step.

20. An image processing program for causing a computer to execute the processes of the steps in the image processing method of claim 17.

* * * * *